United States Patent [19]
Wilde

[11] Patent Number: 5,828,382
[45] Date of Patent: Oct. 27, 1998

[54] APPARATUS FOR DYNAMIC XY TILED TEXTURE CACHING

[75] Inventor: Daniel P. Wilde, Cedar Park, Tex.

[73] Assignee: Cirrus Logic, Inc., Fremont, Calif.

[21] Appl. No.: 691,762

[22] Filed: Aug. 2, 1996

[51] Int. Cl.$^6$ .............................. G06F 15/00; G06T 1/00
[52] U.S. Cl. .......................... 345/501; 345/509; 345/425; 345/430
[58] Field of Search .......................... 345/419, 425–431, 345/501, 507–509, 522; 711/118, 119, 121, 136, 202

[56] References Cited

U.S. PATENT DOCUMENTS

| | | | |
|---|---|---|---|
| 4,583,185 | 4/1986 | Heartz et al. | 364/521 |
| 4,586,038 | 4/1986 | Sims | 340/729 |
| 4,692,880 | 9/1987 | Merz et al. | 364/521 |
| 4,714,428 | 12/1987 | Bunker et al. | 434/43 |
| 4,715,005 | 12/1987 | Heartz | 364/521 |
| 4,727,365 | 2/1988 | Bunker et al. | 340/728 |
| 4,811,245 | 3/1989 | Bunker et al. | 364/521 |
| 4,821,212 | 4/1989 | Heartz | 364/521 |
| 4,825,391 | 4/1989 | Merz | 364/526 |
| 4,855,937 | 8/1989 | Heartz | 364/521 |
| 4,862,388 | 8/1989 | Bunker | 364/521 |
| 4,905,164 | 2/1990 | Chandler et al. | 364/518 |
| 4,958,305 | 9/1990 | Piazza | 364/522 |
| 4,965,745 | 10/1990 | Economy et al. | 364/518 |
| 5,126,726 | 6/1992 | Howard et al. | 340/728 |
| 5,179,638 | 1/1993 | Dawson et al. | 345/425 |
| 5,187,754 | 2/1993 | Currin et al. | 382/54 |
| 5,191,642 | 3/1993 | Quick et al. | 395/127 |
| 5,268,996 | 12/1993 | Steiner et al. | 395/126 |
| 5,293,467 | 3/1994 | Buchner et al. | 395/122 |
| 5,357,579 | 10/1994 | Buchner et al. | 382/1 |
| 5,367,615 | 11/1994 | Economy et al. | 395/129 |
| 5,420,970 | 5/1995 | Steiner et al. | 395/133 |
| 5,488,684 | 1/1996 | Gharachorloo et al. | 345/423 |
| 5,649,173 | 7/1997 | Lentz | 345/501 |

OTHER PUBLICATIONS

*Based on US App 08/438,860 filed May 10, 1995.

*Primary Examiner*—Kee M. Tung
*Attorney, Agent, or Firm*—Steven A. Shaw

[57] ABSTRACT

A graphics subsystem includes hardware for permitting tile texture data to be dynamically cached internally within the hardware. In addition, the system generates a SHIFT signal to permit automatic adjustment of tile texture parameters to facilitate retrieval of the cached texture maps. The system includes a 1 kbyte static random access memory internally disposed within a graphics processor to facilitate UV caching of the texture maps by the graphics processor. A cache controller also disposed within the graphics processor facilitates tile requests by other resources in the graphics subsystem to the internal static random access memory. The cache controller performs UV tile read hit comparisons and subsequent UV to linear address conversions to read texels from the internal static random access memory.

21 Claims, 8 Drawing Sheets

APPARATUS FOR DYNAMIC XY TILED TEXTURE CACHING

FIELD OF THE INVENTION

The present invention relates to graphics processors, more specifically, the present invention relates to the rasterization of graphics data to host memory using display list processing.

BACKGROUND OF THE INVENTION

The use and application of computer graphics to an increasing number of systems environments continue to grow. This growth has been accelerated to an even greater extent with the availability of faster and faster information processing, storage, memory and retrieval devices. The speed of operation of such devices remains a high priority design objective. This is especially true in a graphics system and even to a greater extent with 3D graphics systems. Such graphics systems require a great deal of processing for huge amounts of data and the speed of data flow is critical in providing a new product or system or in designing graphics systems to apply to new uses.

Many methods exist in computer graphics environment to present information on a graphics display device. One of such methods is using polygons to draw graphics primitives such as lines and objects. The polygons may generally be reduced into a series of scan lines which align to the edges of the polygon and to a pixel grid. The pixel grids are generally accessed in a sequential manner i.e., XY addressing. Each accessed pixel grid is then textured with a variety of texture maps.

In addition to the basic position and color parameters, graphics controllers are available which permit the texture of polygons to be represented as part of the display. A texture may be defined as an image of a pattern generated by the graphics processor.

Texture mapping is a computer graphics technique which comprises a process of overlaying a source texture on to a polygon surface to add realism to computer generated three dimensional images. It enhances the visual reality of raster scan images substantially while incurring a relatively small increase in computational time. In general, texture mapping allows a multidimensional image to be mapped to a multi-dimensional space by taking into account the perspective of the mapping algorithm. A texture may, for example, be thought of such as a sandpaper, a roadbed and so forth or as the pattern of pixels (picture elements) on a sheet of paper. The pixels may be arranged in a regular pattern such as a checkered board or may exhibit high frequencies as in a detailed photograph of high resolution.

While a pixel grid stored in memory is represented by a two dimensional space in a linear accessed memory, perspective mapping of texture maps often results in the texel samples to move through the texture map in a nonlinear fashion. As a polygon is being rendered in X space (walking an ortho span) on a display screen, the texel samples will be moving in both U and V space in memory. Thus, in order to achieve fast texture mapping, the memory type used for texture mapping storage must have low latency for random access.

Most graphics subsystems store texture maps in main system memory. Storing the maps in main memory may require a graphics drawing engine to access the texture maps via a bus external to the graphics processor. Each such access and transfer of the texture maps results in processing delays due to inherent memory latency. These latencies substantially slow down the rate at which the graphics processor can therefore process the texture maps.

To alleviate the processing load and data throughput experienced by the system bus, some very high end texture mapping engines use either large internal static random access memory (SRAM) internal buffers or high speed external SRAMs for storing the texture maps. However, many of these low end texture map engines may only make use of a small part of their frame buffer for texture map storage. This is usually some form of DRAM technology which with poor random access rate does not solve the slow processing rates of the texture maps.

Prior art texture map engines which utilize large external SRAM buffers offer excellent random access rate of texel per system clock rate. However, these engines experience real estate constraint as a result of the large internal SRAMs which tend to occupy a large die area and consequently proof to be very costly. For example, in order for the texture map engine to store 256×256×16 bpp, the internal SRAM buffer would have to be at least 128 Kbytes.

Another method used in the prior art to store texture maps is to have an external SRAM or DRAM to store the texture maps. Having an external SRAM provides a good random access rate, however, this method of storing can still be very costly due to high SRAM prices. Furthermore, the access rate to the external SRAM banks is about half of that of internal SRAM. This may be because the texture engine has to pass addresses and receive data from sources external to the graphics processor.

An external DRAM, on the other hand, provides good sequential access and is less expensive than an SRAM, but has long latency for random accesses. Since real texture mapping applications are going to be rendering in both U and V space, the random access penalty experienced by using external DRAM storage means often results in poor overall system performance.

The above illustrated problems become even worse when using a Rambus based DRAM (RDRAM) for texture storage. Although RDRAMs have excellent burst data rate of approximately 528 Mbytes/Sec, they also have a substantial random access rate due to the long latency which may be approximately 3 Mbytes/sec. The problem with poor random reads becomes even worse if the host computer's system main memory is used for texture map storage. Accessing system main memory requires arbitrating for the system bus (e.g., PCI bus) and a subsequent arbitration for shared memory resources in the host system. There is also a standard penalty of random access to a DRAM based memory system which may be experienced by the texture map engine. This obviously results in very long memory latency and poor random access.

The architectural challenges therefore presented by texture mapping and texture map storage is that of distributing the processing load to achieve better system performance. Thus, what is needed is a graphics processor which effectively stores texture maps which may be efficiently accessed by the graphics drawing engines without incurring any of the inherent random access latency problems experienced in using external memory storage devices. A system is also desired which allows the graphics processor to take advantage of the high burst rates of system buses such as the PCI bus and high bandwidth memory devices, such as RDRAMs, in retrieving texture maps from the texture engines to the drawing engines.

SUMMARY OF THE INVENTION

An improved graphics information storage method and apparatus is provided which stores graphics texture maps internal to a graphics processor to enable fast storage and retrieval to a graphics drawing engine. The present invention includes internal cache storage units for storing texture maps and an internal cache controller for controlling the internal cache units. The texture map is cached internal to the graphics processor as UV tiles of the texture map. The internal SRAM memory is divided into a number of cache tiles (ways). Each cache tile is capable of holding a UV section (tile) of texture memory. The internal cache controller is capable of doing UV tile read hit comparisons and subsequent UV to linear address conversions to read the texel from The SRAM.

The internal cache controller is also capable of generating the UV tile fetch request to an XY memory controller. Caching UV tiles allows the graphics processor to take advantage of the high burst rate fills to load the cache ways. These tile fetches happen at the burst access rate of the memory technology. By caching a UV tile, the likelihood of the next texel fetch being a cache hit is very high. Anytime the texel is in internal cache, the access is zero wait state. Caching texture memory in UV tiles is required due to the nature of consecutive texel addresses moving in both U and V space simultaneously.

BRIEF DESCRIPTION OF THE DRAWINGS

The various features and advantages of the present invention will become apparent from the following detailed description taken in conjunction with the accompanying drawings, wherein like references numerals designate like structural elements, and in which.

DESCRIPTION OF THE PREFERRED EMBODIMENTS

In the following detailed description of the present invention, numerous specific details are set forth in order to provide a thorough understanding of the present invention. However, it will be obvious to one skilled in the art that the present invention may be practiced without these specific details, or by using alternative elements or methods. In other instances well known methods, components, and circuits have not been described in detail as not to unnecessarily obscure aspects of the present invention.

Figure 1:
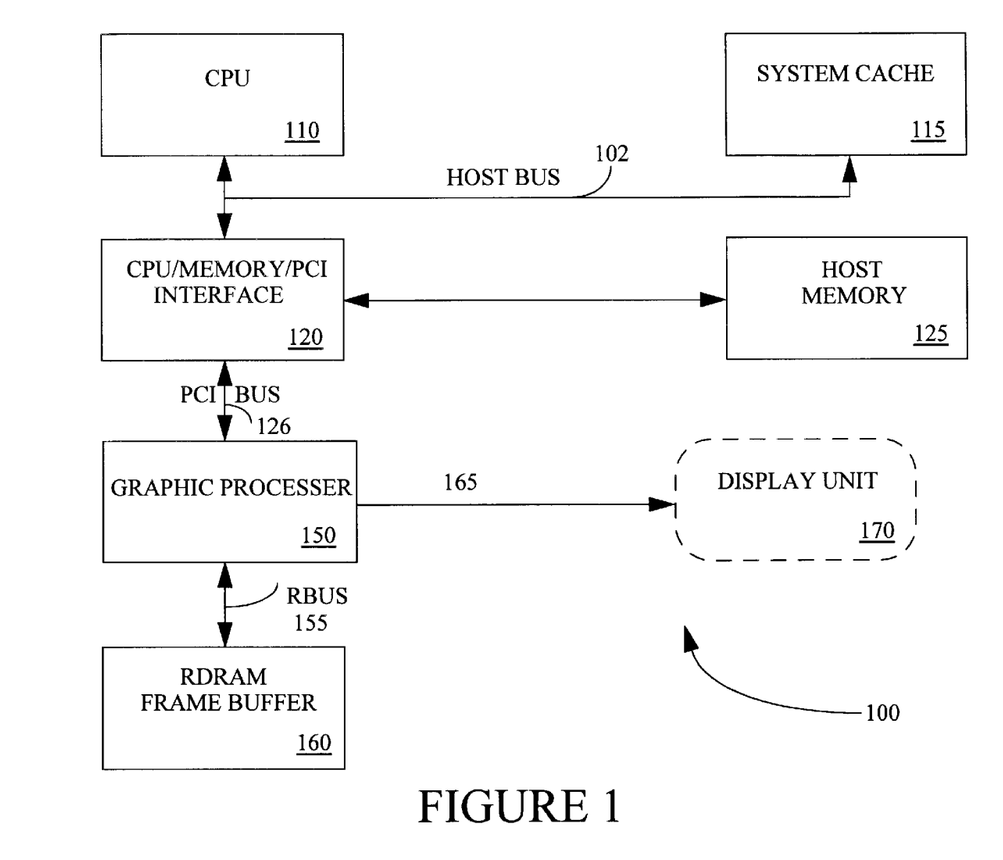
FIG. 1 is a simplified block diagram of a graphics system coupled to a system bus of a host computer system, where the graphics system includes a graphics processor implemented according to the present invention.

Referring now to FIG. 1, a simplified block diagram is shown of a graphics system coupled to a system bus 126 of a host computer system 100, where the computer system includes a central processing system 150, system cache memory 115, main memory 125, and a graphics processor 150 implemented according to the teachings of the present invention. The host bus 126 is a one of a plurality of different types of host buses. In the preferred embodiment of the present invention, system bus 126 may preferably be a peripheral component interconnect (PCI) bus. Central processor (CPU) 110 is coupled to bus 126 to process data and information which may include graphics data and information utilized by the graphics processor of the present invention. Graphics processor 150 preferably may be a 32 bit or 64 bit graphics processor operating at a frequency of at least 33 megahertz (MHZ) and is coupled to PCI bus 126 through a bus interface which may allow graphics processor 150 to master PCI bus 126 or serve as a slave device on bus 126.

Graphics processor 150 includes the capabilities to rasterize graphics data or information from CPU 110 to either display memory 160 or main memory 160 depending on the address offset in the display information. Display memory 160 may include a frame buffer for storing the XY information for graphics primitives rendered to display unit 170, and a Z-buffer for storing depth information representing depth values of such graphics primitives.

In the preferred embodiment of the present invention display memory 160 comprises a bank of RDRAM buffers where digital data stored in the RDRAM comprises a rectangular array of picture elements referred to as pixels or pixel values. The RDRAM buffers 160 provide a performance improvement by permitting faster access to display information and instructions, compared to accessing data stored in main memory 125. The graphics processor 150 communicates to display memory 160 via address data and control lines, collectively referred to as an RBUS 155. Display unit 170 is coupled to bus 165 to display graphics images and may be any type, such as a cathode ray tube (CRT) for desktop, workstation or server application, or a liquid crystal display (LCD) or the like commonly used for portable computer.

Computer system 100 may further include other peripheral components which may not be pertinent to the present invention. These peripheral devices may include an alphanumeric input device (including alphanumeric and function keys) for communicating information and command selections to CPU 110, a cursor control device for communicating user input information and command selections to CPU 110, and a signal generating device coupled to bus 102 for communicating command selections to CPU 110.

Figure 2:
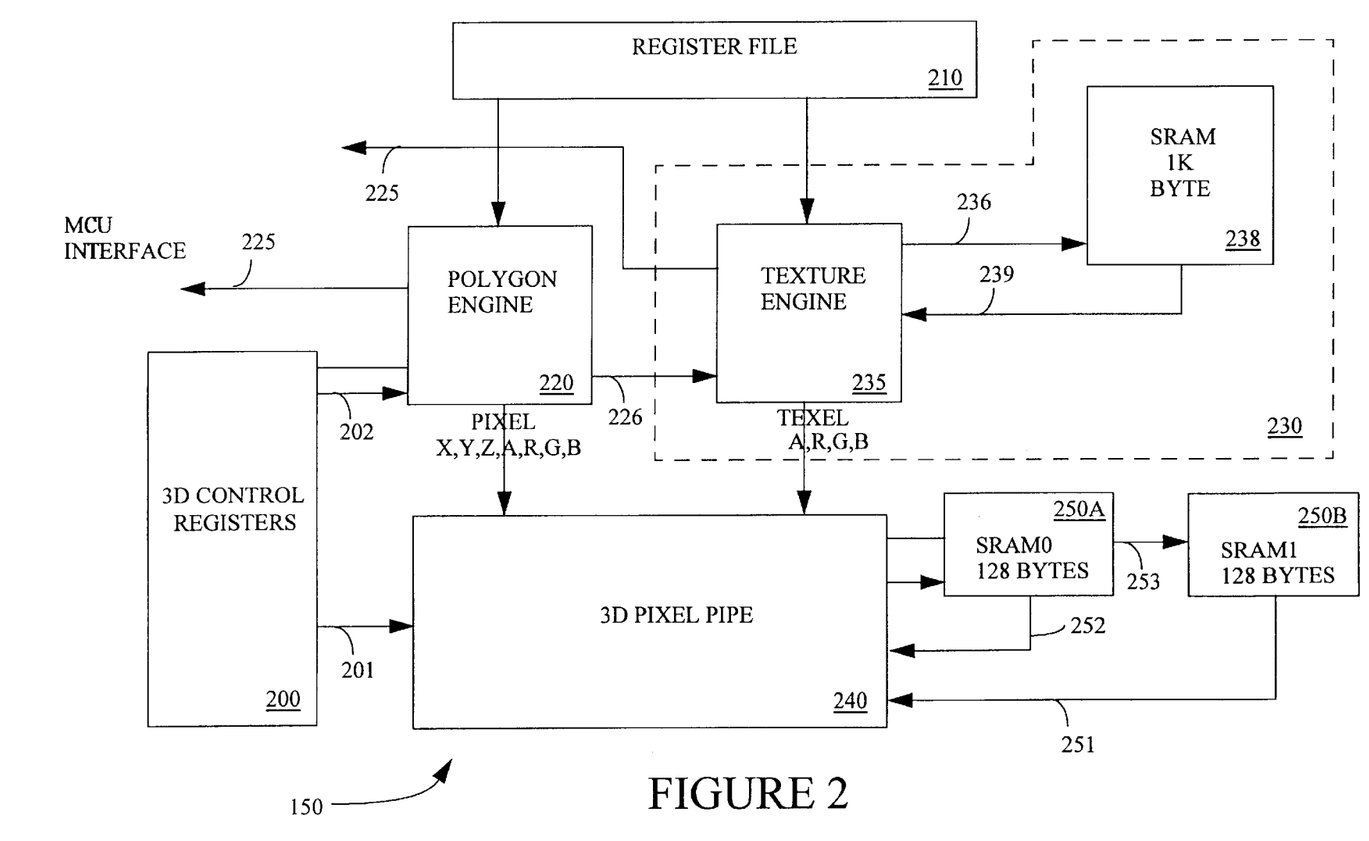
FIG. 2 is a simplified block diagram of the graphics processor of FIG. 1.

Referring now to FIG. 2, the graphics processor 150 constructed in accordance with the preferred embodiment includes a register file 210, a three dimensional (3D) control register 200, polygon engine 220, texture map control circuit 230, 3D pixel pipe 240, and a plurality of internal SRAMs 250A and 250B.

As is shown in FIG. 2, register file 210 is coupled to polygon engine 220 and texture engine 235. Register file 210 preferably stores the initial and incremental values of graphics primitives to be rendered by graphics processor 150. The outputs values of the register file 210 are preferably presented to the polygon engine 220 and the texture engine 225 respectively in a single clock cycle, reducing engine initialization latency. Once the contents of the register file 210 have been loaded into polygon engine 220 and texture engine 235, the register file 210 is free to be loaded with the parameters for the next primitive to be rendered, further reducing engine initialization latency.

The polygon engine 220 is coupled to the register file 210 to receive the initial and incremental values required to fully specify the primitive to be rendered, as may be specified by the main slope/ortho algorithm implemented by the graphics processor 150. The input parameters for a Z buffered shaded triangle rendering typically consist of base X,Y,Z positional values, width1, width2, count1, count2. Size values and R,G,B color values; main edge slopes of X,Z,R,G,B,width1, and width2; and ortho slopes of Z,R,G,B.

The terms used for these parameters are Xm, Ym, W1m, W2m, Count1, Count2, Rm, Gm, Bm, dXm, dZm, dW1m, dW2m, dRm, dGm, dBm, dZo, dRo, dGo, dBo. Where "m" stands for main slope, "d" stands for delta change per unit step, and "o" stands for orthogonal slope. After the initial parameters of a graphics primitive is loaded into the register file 210, the polygon engine 220 draws orthogonal span lines in frame buffer 160 to fill in the polygon. The polygon engine 220 further functions to calculate pixel position, color intensity etc.,.

Texture engine 235 is coupled to the register file 210 to receive the initial and incremental values required to fully specify the texture to be fetched, as specified by the bi-linear main slope/ortho algorithm implemented. The input parameters for perspective correct texture mapping consist of base U,V positional values, main edge slopes of U,V,U2,V2, Uorthogoadd, Vorthoadd, and otho slopes of U,V,U2,V2. The terms used for these parameters are Um, Vm, dU2m, dV2m, dUorthoaddm, dVorthoaddm, dUo, dVo, dU2o, dV2o. Where "m" stands for main slope, "d" stands for delta change per unit step, and "o" stands for orthogonal slope. The texture engine 235 preferably couples to SRAM 238 to cache the texture maps which may be used to preferably fill in, or shade polygons drawn by the polygon engine 220. The texture engine 235 of the preferred embodiment uses inverse mapping techniques and may run in parallel with the polygon engine 220.

The texture engine 235 also receives the polygon size information from the register file 210 in order to track the exact number of texels that must be fetched to complete the primitive to be rendered. Thus, the texture engine 235 and the polygon engine 220 may operate asynchronously to each other while rendering in a triangle in X,Y,Z space. The texture engine 235 internal address generators use the initial/incremental U,V values received from register file 210 to formulate the U/V texture map address of every texel required. Texture map source may be read from the display memory 160 or host system memory 125 and is read into an internal texture SRAM 238 inside graphics processor 150.

Textures stored in display memory 160 are addressed X/Y and use a tiled memory format to allow for high speed access of XY portions of memory from the RDRAM 160. Textures stored in host system memory 125 are preferably stored in a tile linear format which allows an entire cache tile to be store linearly in memory space. Storing the textures in a tiled linear format allows the graphics processor 150 to fetch the tile across the PCI bus 126 in a single burst cycle. Textures stored in host memory 125 can optionally be stored linearly, but this will require a tile fetch to be done with multiple PCI cycles which greatly reduces performance of a cache tile fill.

In the preferred embodiment of the present invention, SRAM 238 is tiled and internal to graphics processor 150. SRAM 238 is preferably divided into a number of cache tiles (ways) and is designed to tile an XY region of texture map instead of caching a linear region of texture map. Each cache tile is capable of holding about 64 byte chunks of UV section (tile) of texture memory.

Still referring to FIG. 2, the polygon parameters including the texture values are loaded into the 3D pixel pipe from the polygon engine 220 and the texture engine 235 to be drawn into the SRAMs 250A and 250B. The texture engine 235 data and polygon engine 220 data are aligned as they are loaded into 3D pixel pipe 240 in order to put the correct texel color into the correct pixel location.

In the preferred embodiment of the present invention, two 128 byte SRAMs are coupled to the 3D pixel pipe 240 internal to graphics processor 150 to temporarily store pixel data from the 3D pixel pipe prior to down loading the data into the frame buffer 160.

Figure 3:
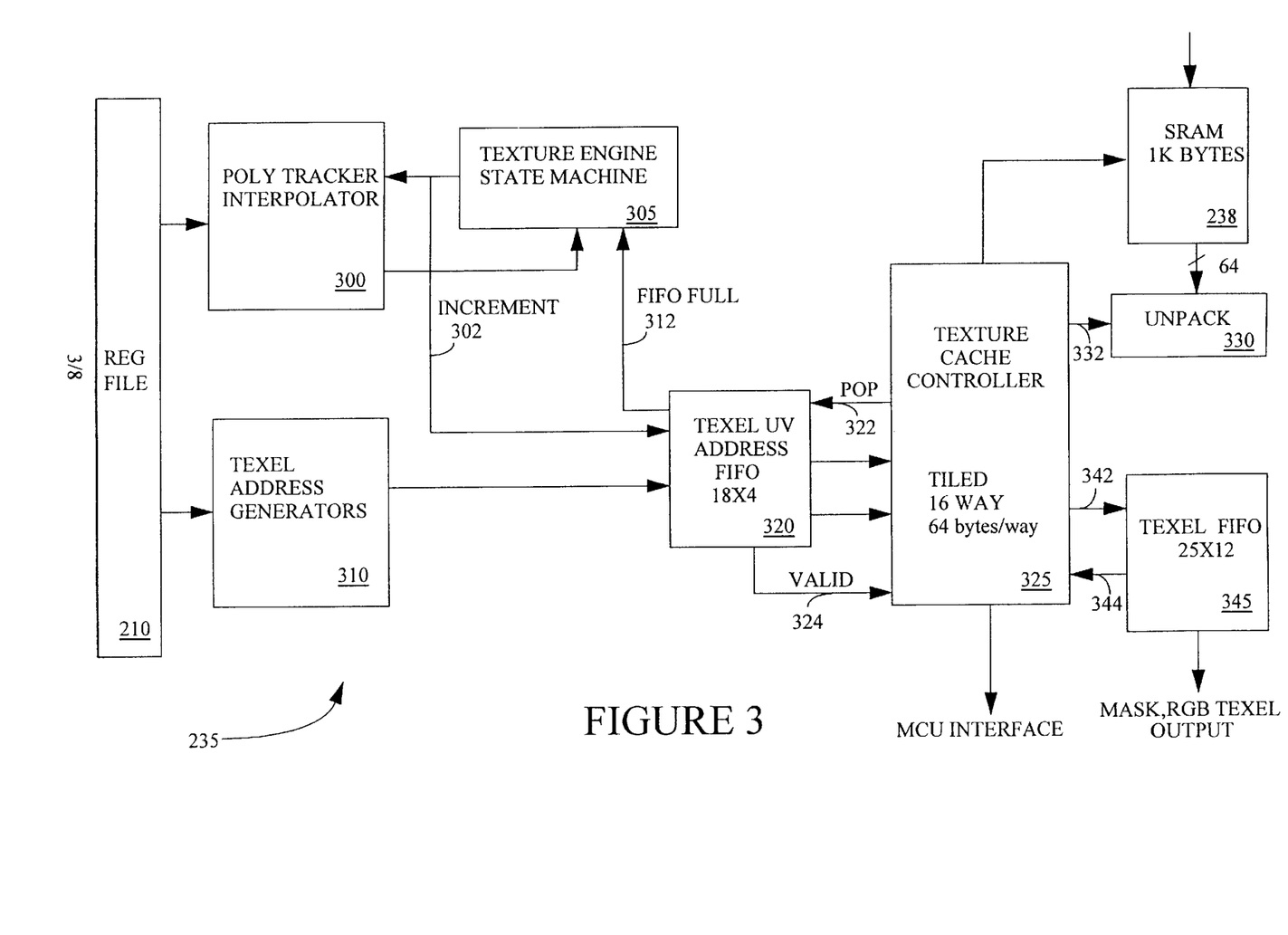
FIG. 3 is a simplified block diagram showing the internal circuitry of a texture engine of the graphics processor of FIG. 1.

Referring now to FIG. 3 is a block diagram illustrating the internal logic circuitry of the texture engine 235 of one embodiment of the present invention. The texture engine 235 preferably comprises a polygon tracker interpolator (PTI) 300, a texture engine state machine (TSM) 305, a texel address generator (TAG) 310, and a texture cache controller (TCC) 325. The texture engine 235 further comprises a texel UV address FIFO (TAF) 320, a 1 K byte SRAM 238, a texel unpacker (TUP) 330, and a texel data FIFO (TDF) 345. Polygon and texture data from the register file 210 are loaded into PTI 300 and TAG 310 respectively after initialization of a polygon draw cycle. PTI 300 preferably receives polygon size information from the register file 210 in order to track the exact number of pixels per span and the number of spans to be rendered by the polygon engine 220. The output of PTI 300 couples to TSM 305.

TSM 305 couples to PTI 300 and TAF 320 to monitor and control the status of texel rendering from the texture engine 235. TSM 305 receives an output signal SPAN_COMPLETE 314A and POLYGON_COMPLETE 314B from PTI 300 to indicate when a span and a polygon operation has been completed respectively. TSM 305 also receives output signal FIFO_FULL 312 from TAF 320. TSM 305 monitors the FIFO_FULL signal 312 from the TAF 320 and the SPAN_COMPLETE signal 314A and the POLYGON_COMPLETE signal 314B from PTI 300 for not full and not complete conditions respectively. TSM 305 then asserts the INCREMENT signal 302 to TAG 310 and PTI 300 to increment to the next texel while writing the current texel into the TAF 320.

TAG 310 preferably couples to the register file 210 to receive the base and incremental UV values required to initialize the TAG 310 address interpolators. TAG 310 subsequently generates the UV addresses of every texel needed to be fetched from SRAM 238 to complete the polygon rendering. TAG 310 receives as further inputs INCREMENT signal 302 from TSM 305 to increment its address interpolators. The UV addresses generated by TAG 310 are subsequently loaded into TAF 320 when INCREMENT signal 302 is asserted by TSM 305.

The output signal of TAF 320 is driven to texture cache controller (TCC) 325 which then determines whether a requested address location exits (HIT) in SRAM 238 or not (MISS). TCC 325 is coupled to receive as inputs the output signals of TAF 320. TCC 325 is capable of performing UV tile read hit comparisons and subsequent UV to linear address conversions to read texels from SRAM 238.

TCC 325 is also capable of generating a UV tile fetch request to a XY memory control interface. TCC 325 preferably controls UV address requests to and from SRAM 238 by the texture engine 220. Upon receiving the UV address requests, TCC 325 further caches the texture map corresponding to each coordinate for each polygon rendered. TCC 325 always fetches complete UV tiles of texture when a cache miss occurs instead of just a single texel. Caching UV tiles allows the graphics processor 150 to take advantage of the high burst rate fills to load the cache ways in SRAM 238. SRAM 238 is coupled to TCC 325 to store UV tile chunks of the texture memory.

The output signal of SRAM 238 is driven to the texel unpacker (TUP) 330 in order to select the correct texels out of the 64 bit SRAM 238 data bus. The TCC 325 controls texel selection via signal 332. The output signal of TUP 330 is driven to the texel data FIFO (TDF) 345 in order to buffer texels prior to being loaded into the 3D pixel pipe 240. The TDF 345 is preferably twelve locations deep allowing the texture engine 235 and polygon engine 220 to operate asynchronously. TCC 325 monitors the full status signal 344 of the TDF 345 and asserts the PUSH signal 342 to write texels when appropriate.

Figure 4:
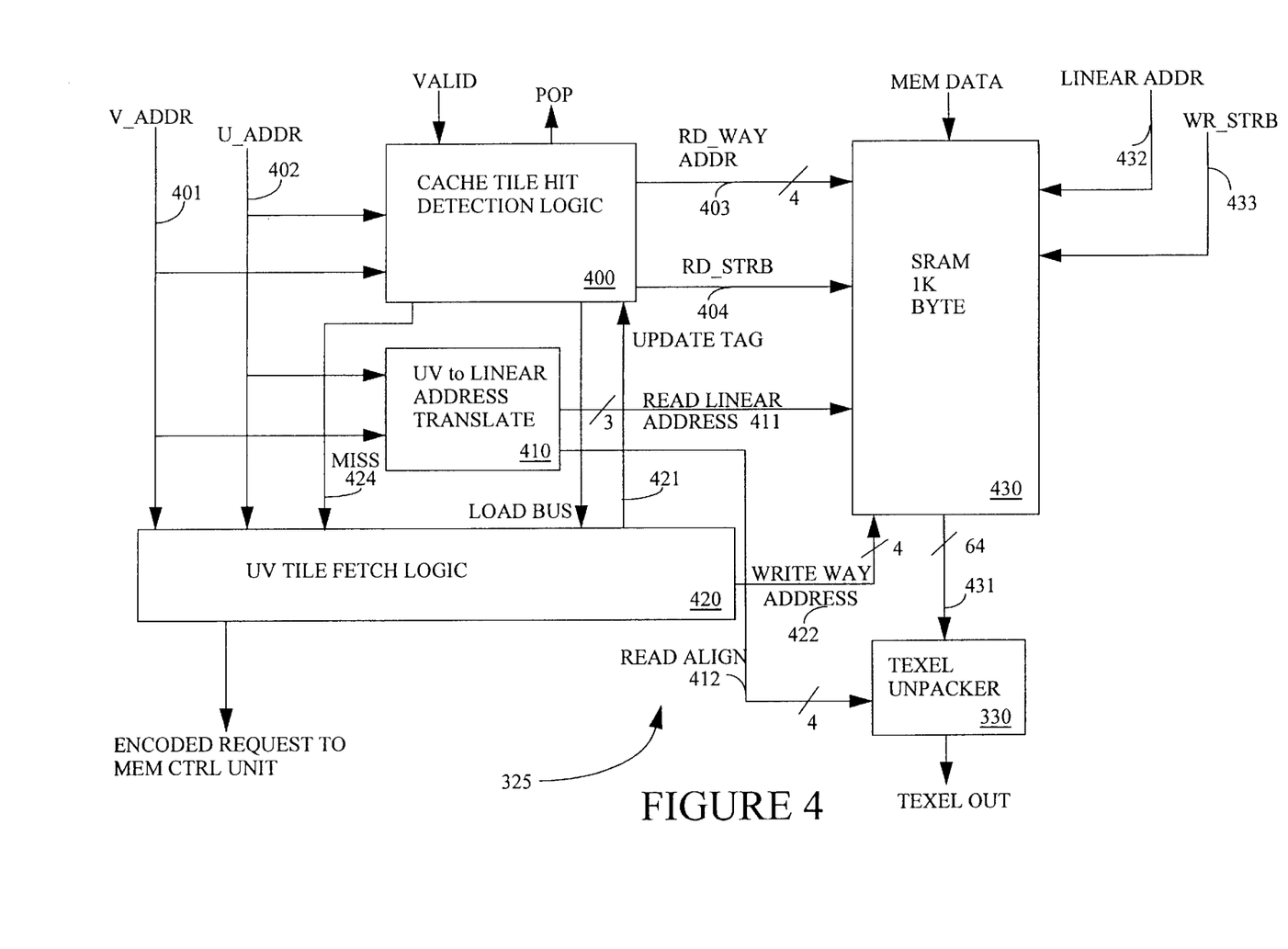
FIG. 4 is a simplified diagram of a state machine of the texture engine of FIG. 3.

Referring now to FIG. 4, a simplified block diagram of a portion of the texture cache controller 325 of FIG. 3 is shown. TCC 325 preferably comprises a cache tile HIT detection logic circuit (CTDL) 400, a UV to linear address translation circuit (ATC) 410, and a UV tile fetch logic circuit (TFL) 420. As is shown in FIG. 4, V_ADDR signal 401 and U_ADDR signal 402 couple to CTDL 400, ATC 410, and TFL 420 respectively to provide requested U and V address locations to SRAM 238.

As will be described in further detail in FIG. 5, CTDL 400 preferably receives the UV address request from TAF 320 and determines whether a requested address currently exists in SRAM 238 (HIT?). CTDL 400 generates a RD_WAY signal 403 in response to a UV address request to address a way (Tile) in cache 430 if there is a hit and a RD_STRB signal 404 to both read the data from the cache 430 and a "pop" the UV address off the TAF 320. The RD_WAY address signal 403 is preferably connected to the 4 high order address bits of SRAM 238.

ATC 410 is coupled to receive the UV address requests and to preferably translate the UV addresses into linear address which may be fetched from SRAM 238. It is important to note that a 64 byte SRAM cache tile is organized as 8 linear addressed octbyte (8 bytes) locations. ATC 410 generates a READ LINEAR ADDRESS signal 411 to SRAM 238 upon completing a UV to linear address translation. In the preferred embodiment of the present invention, read linear address signal 411 is 3 bits wide and may be used to address the correct octbyte in a tile. The READ LINEAR ADDRESS signal 411 is preferably connected to the 3 low order address bits of SRAM 238. ATC 410 generates a READ ALIGN signal 412 to the TUP 330 to select the correct texel from the 64 bit SRAM 238 data output bus.

TFL 420 is coupled to receive requested UV address locations from TAF 320. TFL 420 fetches a requested address to a memory control unit if CTDL 400 determines there is a cache MISS 424. TFL 420 generates a WR_WAY address signal 422 to SRAM 238 to address the correct SRAM tile for storage of the new UV texture tile. In the preferred embodiment of the present invention, WR_WAY address signal 422 is a 4 bit wide address signal to allow uniquely addressing one of 16 cache ways in the SRAM 238. The WR_WAY address signal 422 is preferably connected to the 4 high order address bits of SRAM 238.

In the preferred embodiment of the present invention, TFL 420 takes the U and V texel address and applies a mask to it to calculate the U start and V start addresses of the tile that contains the texel because of the tile caching architecture only supports caching aligned UV tiles. Since there are always 8 texels in the U space of a tile, TFL 420 masks off the 3 low order bits of each address. The mask address for the V address is initially calculated based on bytes per texel which is followed by applying the mask.

The memory controller interface requires the U_Start, V_start, U_extent, and V_extent of the UV space to fetch these signal are generated based on the UV tile address and the bytes per texel information. TFL 420 includes state machine logic which generates a request signal (REQ) when a MISS is detected in the CTDL 400. When the REQ signal is generated, TFL 420 enters a wait state to wait for an acknowledgment (ACK) signal from the memory controller indicating the presence of the required data in the SRAM 238. TFL 420 then generates an UPDATE_TAG signal 421 in order to update and validate new UV tile tag addresses into the tag registers.

Figure 5:
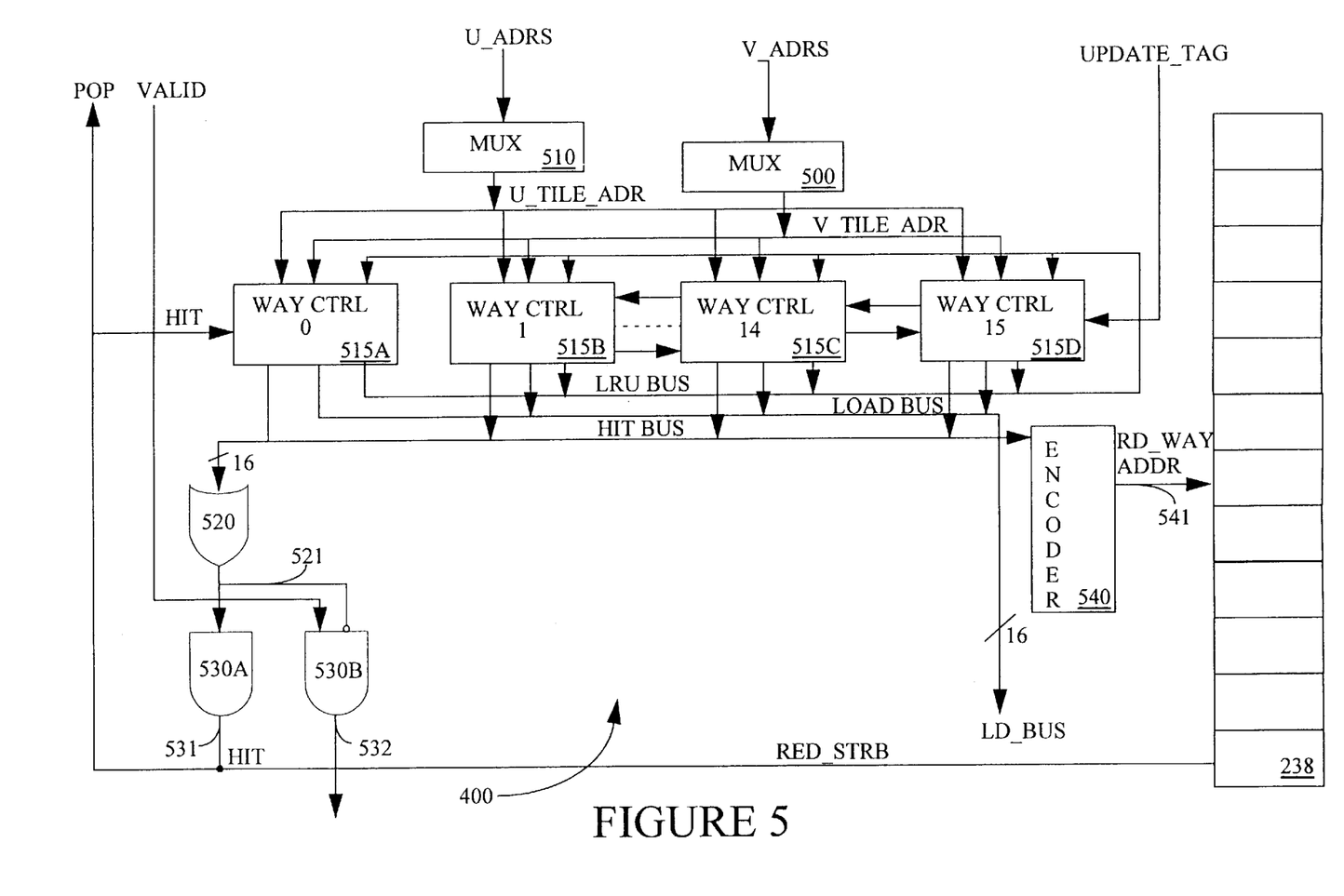
FIG. 5 is a simplified block diagram of a texture cache controller of the present invention.

FIG. 5 is a simplified block diagram of one embodiment of the internal circuitry of the Hit detection logic unit (CTDL) 400 of the present invention. CTDL 400 preferably includes MUXes 500 and 510, Address translator 505, Way controllers 515A–515D, OR logic gate 520, AND logic gate 530A and 530B, and Address Encoders 540.

As is shown in FIG. 5, MUX 500 and 510 are coupled to TAG 310 to receive the U and V address generated via TAF 320 respectively. MUX 500 and 510 calculate the U and V tile addresses corresponding to texel requested. In the preferred embodiment of the present invention, the U tile address is calculated by shifting off low order U_address bits that represent the number of texels in the U space of a tile. For example, assume U texel per tile is 8, the U_tile will be equal to U_texel_address divided by U_texel_per_tile. MUX 500 will preferably shift the U_texel_address by (i.e., U_texel_address>>3) to calculate the U tile address.

Similarly, the V tile address is generated by shifting off the low order V_texel_address bits in MUX 510 which represents the number of lines in the V space of a tile. Calculating the number of lines that will fit into the tile is based on the number of bytes per texel, the number of texels in a tile's V space, and the size in bytes of a tile.

If the texel size is fixed, the lines per tile will preferably be a constant. However, if the texel size is based on a configuration mode where the lines per texel must be precalculated by the graphics processor and used as a constant in calculating subsequent texels.

Thus assume:
U texel per tile=8
tile size=64
bytes per texel=2 lines per_tile=tile_size/(U_texel_per_tile*bytes per tile) lines_per tile=64>>(3+1); {8=2^3 2=2} V tile=V_texel_address/lines_per_tile; U_tile=U_texel_address>>3.

In order to keep tile calculation simple, a pair of multiplexors configured to perform variable right shifts: the tile size in bytes, the U texel per tile, and the bytes per texel are kept at powers of 2. The U tile address and the V tile address generated by MUX 500 and 510 are respectively provided to way controllers 515A–515D to determine whether there is a hit or a miss to SRAM 238.

Way controllers 515A–515D receive the U tile address and V tile address from MUX 500 and 510 via address lines 501 and 502 respectively. If both the U tile and V tile address pair are present in any of the way controllers 515A–515D, the respective way controller generates a match signal to OR logic gate 520 to indicate the presence of a requested tile in SRAM 238. The match signals of all 16 ways are connected to ENCODER 540 which does a 16 to 4 encode to generate the RD_WAY address which is connected to the upper 4 address bits of the SRAM 238 for uniquely selecting the HIT tile.

OR logic gate 520 as discussed above receives match signal 501 from all of the way controllers 515A–515D as its input. In the present invention, OR logic gate 520 is preferably 16 bits wide, one bit for each way. OR logic gate 520 generates an output signal 521 whenever match signal 501 is asserted. Output signal 521 couples to one of the inputs of AND logic gate 530A when a requested UV tile is found in SRAM 238 (e.g., there is a HIT).

AND logic gate 530A also receives as one of its inputs VALID signal 324 which indicates the validity of data being received by hit detection logic unit. AND logic gate 530A generates output signal 531 indicating the presence (HIT) of a requested UV tile in SRAM 238 and is used as a read strobe to the SRAM 238 and as a POP signal 322 to TAF 320. Alternatively, if a requested UV tile is not present n SRAM 226, AND logic gate 530B generates a miss signal 532 to fetch new UV texture maps from either the host memory of the display memory.

Figure 6:
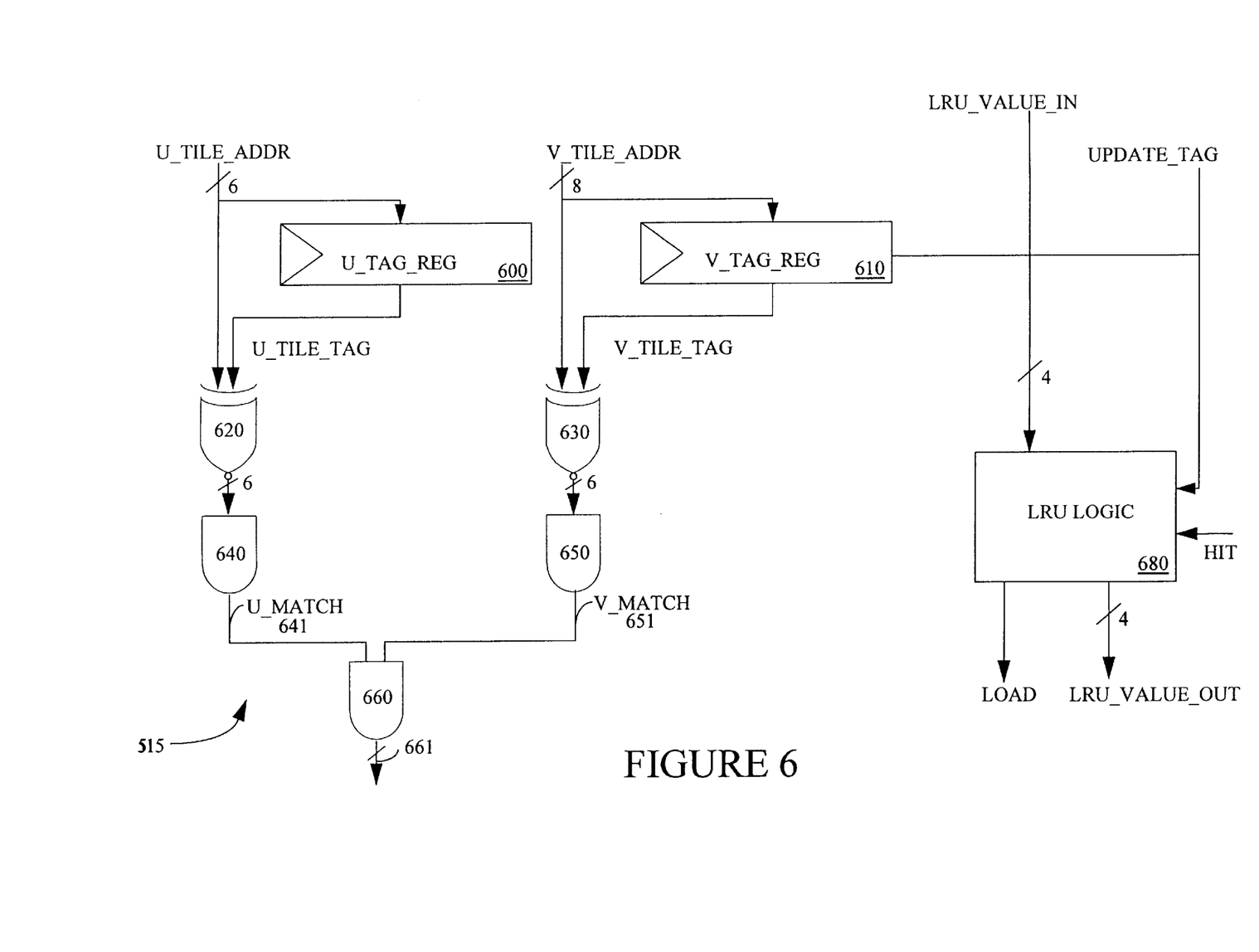
FIG. 6 is a block diagram useful in explaining a UV tile fetch logic of the present invention.

Referring now to FIG. 6 is a block diagram of internal circuitry of one embodiment of the way controllers shown in FIG. 5. The way controller shown in FIG. 6 preferably includes a plurality of Tag registers 600 and 610, a plurality of XNOR logic gates 620 and 630, a plurality of AND gates 640–670, and a least recently used (LRU) logic circuit 680.

As is shown in FIG. 6, TAG registers 600 and 610 are coupled to receive the U and V tile addresses respectively. Upon receiving the U and V addresses, the addresses are respectively latched in TAG registers 600 and 610 for each way controller for future comparison with incoming U and V tile addresses. The outputs of registers 600 and 610 are provided to XNOR gates 620 and 630.

XNOR gates 620 and 630 make up the compare logic in the way controller 515. XNOR gate 620 receives as one of its inputs the U tile address from MUX 500 and the other input is the tag register address from U_TAG_REG 600. Each incoming U_TILE address bit of the current texel is compared against the corresponding U_TILE_TAG address bits to determine if there is an exact match. In the preferred embodiment of the present invention U_TILE_ADRS 601 is 6 bits wide allowing the 64 different tile addresses required to support textures map up to 512 texels in U space (64 tiles*8 texels per tile).

Concurrently XNOR gate 630 receives as one of its inputs the V_TILE address from MUX 501 and the other input the tag register address from V_TAG_REG 610. Each incoming V_TILE_TAG address bit of the current texel is compared against the corresponding V_TILE_TAG address bits to determine if there is an exact match.

In the preferred embodiment of the present invention, V_TILE_ADRS 502 is 8 bits wide allowing the 256 different tile addresses required to support textures map up to 512 texels in V space (256 tiles*2 lines per tile). Both the U and V tile tag compares must be equal to qualify as a tile hit. If the compare logic detects a match with the current UV tile address with the contents of the TAG registers 600 and 610, then AND gates 640 and 650 concurrently assert lines 641 and 651 to AND gate 660 which in turn asserts line 661 to indicate a hit in SRAM 238.

Referring still to FIG. 6, LRU 680 implements a method for tracking which cache tile should be replaced known as Least Recently Used. LRU 680 receives as one of its inputs LRU_VALUE_IN signal 681 and UPDATE_TAG signal 682. LRU_VALUE_IN signal 681 is a 4 bit wide address bus which comprises the LRU value of the way (tile) that was hit last in SRAM 238. The incoming LRU_VALUE_IN signal 681 is compared with the internally latched LRU value to determine whether LRU 680 should modify its internal LRU value.

The way controllers initialize their internal LRU values from 0 to 15, and the way with LRU value equal to zero is the next to be replaced. The way that was just a hit drives its internal LRU values on to the LRU_VALUE_OUT bus and updates its internal LRU value to 15. All other way controllers adjust their internal LRU values based on the relationship between their internal LRU value and the hit ways LRU value.

Figure 7:
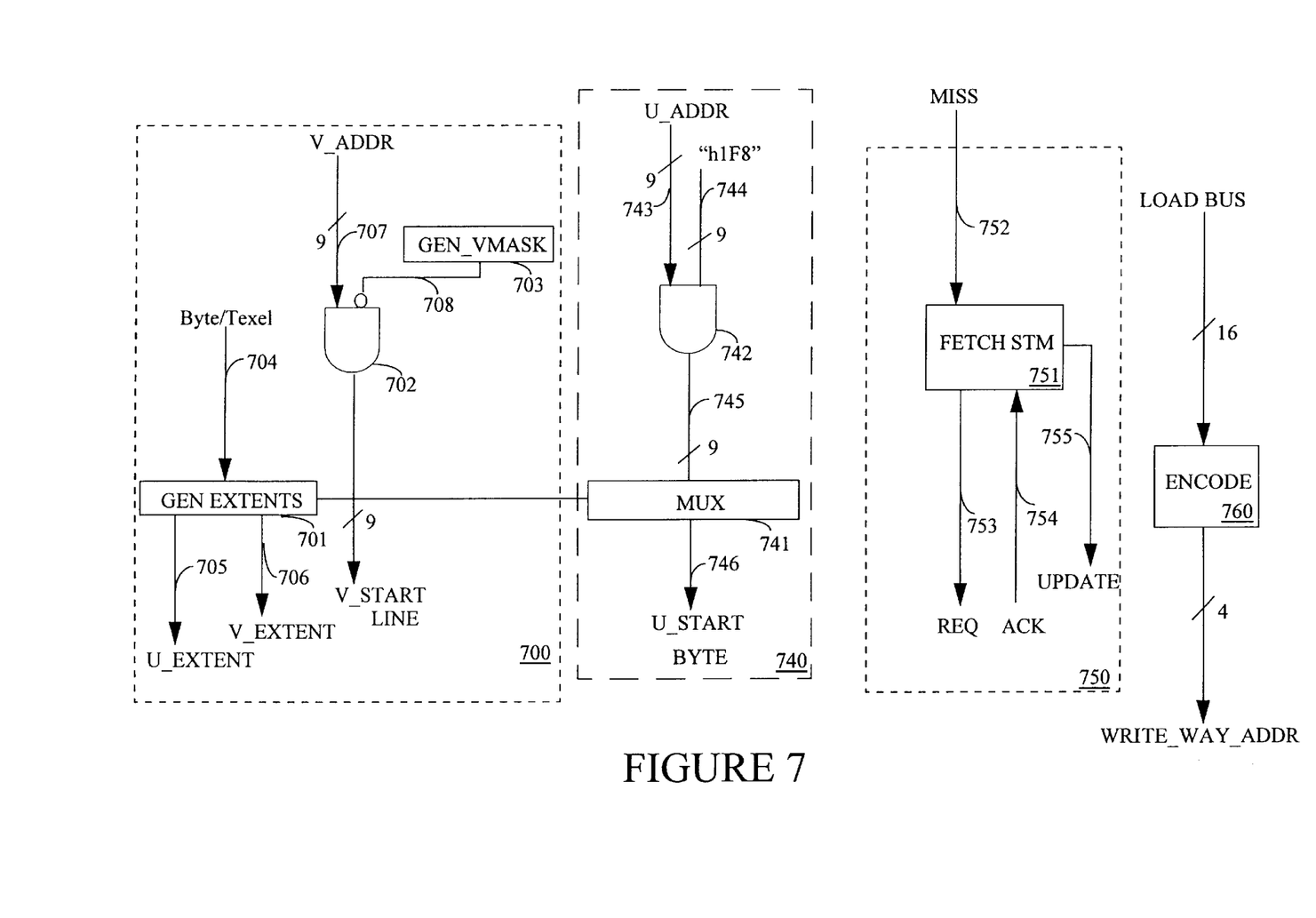
FIG. 7 is a block diagram useful in explaining one aspect of the operation of the texture cache controller of the present invention.

Referring now to FIG. 7 is a simplified block diagram of the internal circuitry of the fetch logic unit TFL 420. As shown in FIG. 7 the fetch logic unit includes a V address fetch unit 700, a U address fetch unit 740, a fetch state machine 750, and ENCODER 760.

V address fetch unit 700 preferably includes a generate V mask circuit (GEN_VMASK) 705, AND gate 702, and a generate extents register (GEN EXTENTS) 715. GEN_VMASK 705 calculates the V mask dependent on the bytes per texel. The V mask is used in the present invention to calculate the V start of a tile that contains a requested texel. The low order V_ADDR address bits are masked with AND gate 702 in order to generate a V_START_LINE address signal 712 that is tile aligned. This is done by masking off the least significant address bits that would represent V lines within a tile.

It is important to note that the caching algorithm of the present invention supports caching aligned tile only. This means the starting V address of a tile is evenly dividable by the V tile size.

GEN EXTENTS 715 is used to generate the U and V extents for a tile to be fetched. The U and V extents are generated from the byte per texel information and are constant for a given byte per texel mode. The U and V extent are used by the memory controller unit to indicate how many bytes in U space to fetch and how many lines in V space to fetch.

U address fetch unit 740 preferably includes a MUX 741 and a plurality of AND gates 742. U address fetch unit 740 receives the U mask (0x1F8) which is used in the present invention to calculate the U start address of a tile that contains the requested texel. This is because the present invention assumes 8 texels per tile in U space. The low order U-ADDR address bits are masked with AND gate 742 in order to generate a U start address 745 that is tile aligned. This is done by masking off the least significant address bits that would represent U texels within a tile.

It is important to note that the caching algorithm supports caching aligned tiles only. That is the starting U address of a tile is evenly dividable by the U tile size. The U start address 745 is connected to MUX 741. MUX 741 scales the U start address signal 745 by the bytes per texel to generate U_START_BYTE address signal 746. The two addresses are then combined to generate the starting point of the tile that contains the texel corresponding to the incoming V address.

The load signals of all 16 ways in FIG. 5 are bussed together to form the LD_BUS and are connected to ENCODER 760 which does a 16 to 4 encode to generate the WE_WAY address that is connected to the upper 4 address bits of the SRAM 238 selecting the location in the SRAM 238 to receive the tile being fetched.

Fetch state machine 750 couples to CTDL 400 MISS signal to initiate a REQ signal to the memory controller unit. THE FSM 750 then monitors the ACK signal from the memory controller unit and generates the UPDATE_TAG signal to the CTDL 400 once receiving the ACK active.

Figure 8:
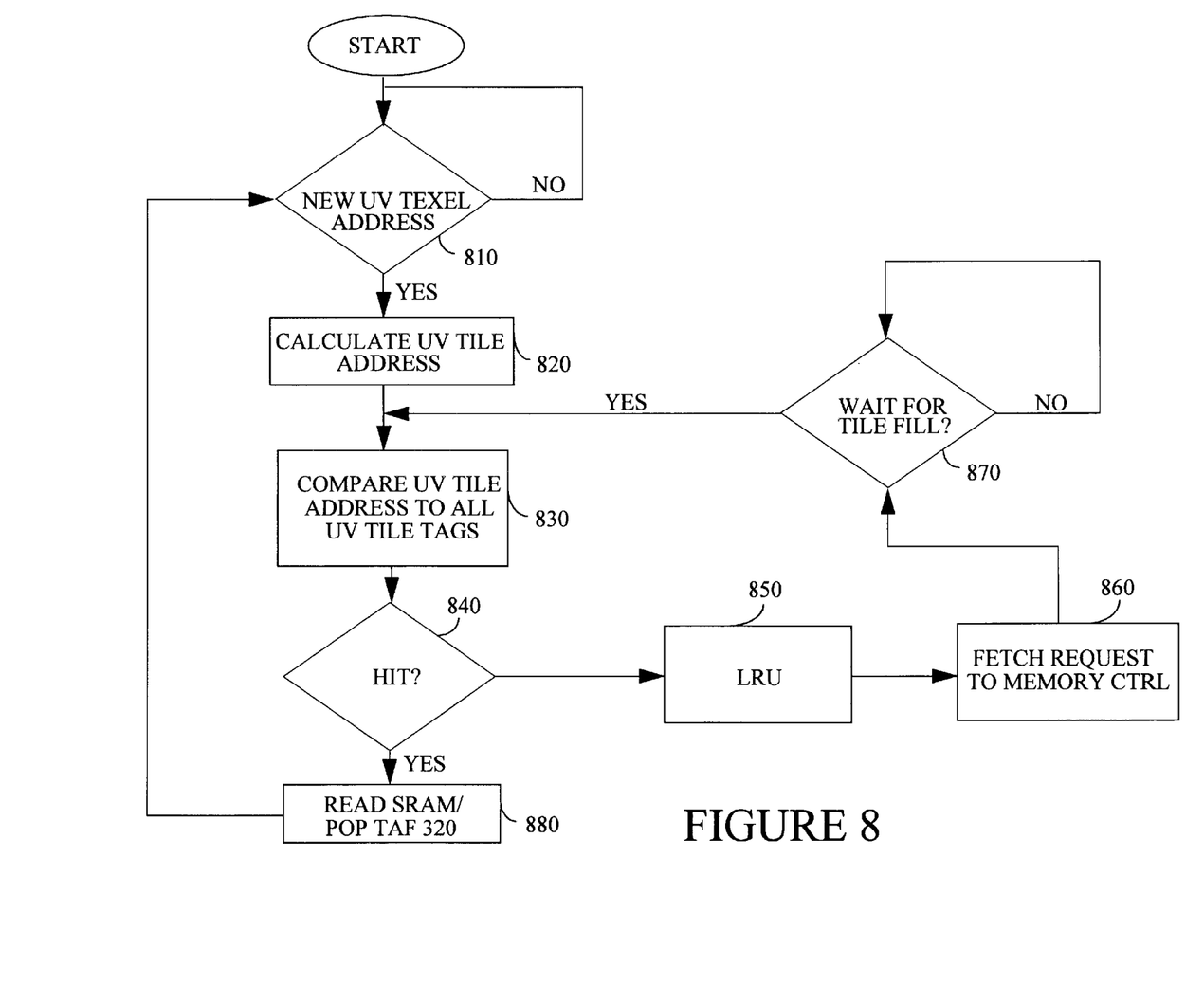
FIG. 8 is a block diagram showing the internal circuitry of one embodiment of the cache tile hit detection logic circuit of the present invention.

FIG. 8 is a flow diagram of the method of one embodiment of the present invention. As shown in FIG. 1, the method initializes at step 800 when a new texture map request is made by the graphics processor 150. At step 810, the texture engine determine whether a new request is for a new UV texel address. If the texture request is for a new UV address, processing continues at step 820; otherwise step 810 is reiterated.

At step 820, if a texture map request is for a new UV address, the tile address of the requested UV map is calculated by the hit detection logic unit as described in FIG. 5. Processing then continues at step 830. At step 830, the calculated UV tile address of a new texture map request is compared with the cache UV address values of previous texture requests. Comparing the incoming UV address values with those cached in the TAG registers 600 and 610 enables the texture engine to respond to the texture map requests locally in the graphics processor.

At step 840, the hit detection logic of the present invention determines whether the compare step detected a match of the newly calculated UV address values and the cached UV address values. If the two sets of addresses match, the hit detection logic assets the "HIT" signal indicating a match and processing continues at step 880. If the address compare does not match processing continues at step 850.

At step 850, if the address compare step is unable to detect a match of incoming addresses and cached addresses, processing continues at step 850 where the graphics processor reads and store the "LRU" value of the incoming UV address request.

At step 860, the UV fetch logic unit sends a fetch request to external memory units (i.e., main memory or display memory) if the incoming UV address request does not match an existing cached UV address and after the "LRU" value of the incoming UV address has been stored. At step 870, after a memory fetch request has been sent to the external memory source, the texture engine waits for the SRAM 238 cache tile to be filled with the new UV tile.

Thus, a method and apparatus for dynamically caching display list information to an internal on-chip cache in a graphics processor has been described. From the above description, it will be apparent that the invention disclosed herein provides a novel and advantageous method and apparatus for executing display list information in a computer system. The foregoing discussion discloses and describes exemplary method and embodiments of the present invention. As will be understood by those familiar with the art, the invention may be embodied in other specific forms without departing from its spirit or essential characteristics, and thus, the described embodiment is not restrictive of the scope of the invention. For example, the invention could be used with any host processor platform, including Intel's X86 processor architecture, the Power PC, DEC Alpha, etc., and could be used with any processor instruction set. The following claims are indicative of the scope of the invention. All variations which come within the meaning and range of equivalency of the claims are to be embraced with their scope.

I claim:

1. A graphics subsystem for rendering texture information representative of graphics primitive on a computer display, comprising:

a host processor for generating display list information of parameter values defining said primitives;

a system memory coupled to said host processor for storing said display list information;

a graphics processor coupled to said host processor and said system memory for processing said texture map information;

wherein said graphics processor includes:
a register file for storing said display list of parameter values;
a polygon engine coupled to said register file for generating polygons responsive to said primitives; and
a texture control unit coupled to said register file for receiving said texture information and generating texture maps representative of said graphics primitives, comprising:
a texture engine for receiving the initial and incremental values of a texture to be fetched from said system memory, said texture engine further receiving polygon size information from said register file in order to track the exact number of texels to complete a primitive to be rendered; and
a static random access memory device disposed within said texture control unit for storing texture maps used to fill in polygons drawn by said polygon engine.

2. The graphics subsystem of claim 1 wherein said SRAM device is tiled internal to said graphics processor to store said texture maps.

3. The graphics subsystem of claim 2 wherein said SRAM device is divided into a number of cache tiles (ways) to hold UV sections of said texture maps.

4. In a computer system having a graphics processor for processing graphics information, said graphics processor comprising:

a register file internally disposed within said graphics processor to receive display list information defining graphics primitives to be rendered in said graphics processor;

a polygon engine coupled to said register file to receive the initial and incremental values required to fully specify said primitive to be rendered;

a texture engine coupled to said polygon engine to receive the initial and incremental values required to specify a texture map; and an internal memory device disposed within said graphics processor and coupled to said texture engine to internally store blocks of said texture map within said graphics processor in a tiled linear format.

5. The computer system of claim 4 wherein said graphics processor further includes a three dimensional pixel pipe coupled to said texture engine and said polygon engine to receive polygon and texture data respectively and wherein said polygon and texture data are aligned as said polygon and texture data are loaded into said 3D pixel pipe in order to put the correct texel color into the correct pixel location.

6. The computer system of claim 4 wherein said internal memory device is a static random access memory (SRAM) device and wherein said SRAM device stores 64 byte blocks of a UV section of said texture information.

7. The computer system of claim 6 wherein said UV section of texture information represent the XY region of a texture map in a texture memory.

8. A graphics processor for processing graphics information, said graphics processor comprising:

a texture control unit for processing texture information of graphics primitive corresponding to said graphics information;

wherein said texture control unit comprises a texture engine coupled to a register file for receiving initial and incremental values of texture parameters corresponding to graphics primitives to be displayed;

said texture engine comprising a polygon tracker interpolator coupled to said register file to receive polygon size information and to track the exact number of pixels per span on a display device; and an internal cache for temporarily storing said initial and incremental values of said texture parameters.

9. The graphics processor of claim 8 wherein said texture engine further includes a texture engine state machine coupled to said polygon tracker for receiving polygon size information and track the exact number of pixels per span on said display device.

10. The graphics processor of claim 9 wherein said texture engine further comprises texel address generators coupled to said register file to receive the base and incremental UV values required to generate the UV addresses of every texel fetched from said internal memory device.

11. The graphics processor of claim 10 wherein said texture engine includes a texel UV address First-In First-Out (FIFO) unit coupled to said texel address generators to receive said UV addresses generated by said texel address generators, said texel UV address generates VALID and POP to indicate when a valid UV address location is present in said internal storage device.

12. The graphics processor of claim 11 wherein said texture engine further includes a texture cache controller coupled to said texel address FIFO to receive said VALID signals and to generate UV tile fetch requests to said internal storage device.

13. A texture cache controller disposed within a graphics processor for controlling texture information fetches from an internal storage device also disposed within said graphics processor; said texture cache controller comprising:

a cache tile hit detection logic unit for receiving UV address requests and determining whether a requested address currently exists in said internal memory device;

a UV to linear address translator coupled to said cache tile hit logic detection unit to receive the UV address requests presented to said texture cache controller and to translate said UV addresses into linear address to be fetched from said internal storage device; and a UV tile fetch logic unit coupled to said UV to linear address translation unit to receive requested UV address locations from said UV to linear address translator.

14. The texture cache controller of claim 13 wherein said UV tile fetch logic unit generates write signals to said internal memory device to write new UV addresses to be stored in said internal storage device.

15. The texture cache controller of claim 14 wherein said cache tile hit detection logic unit includes a plurality of MUXes for receiving U and V texel addresses to calculate the U and V start address of a tile respectively.

16. The texture cache controller of claim 15 wherein said cache tile hit detection logic unit further includes a plurality of way controllers coupled to said MUXes to receive the U and V tile addresses respectively and generating an address present signal to indicate the presence of a requested tile address in said internal memory device.

17. The texture cache controller of claim 16 wherein said cache tile hit detection logic unit further includes a plurality of AND logic gates coupled to said way controllers for generating HIT and MISS signals indicating whether said way controllers find a requested tile address in said internal memory device or not.

18. The texture cache controller of claim 17 wherein said cache tile hit logic detection unit further includes an address encoder coupled to said plurality of way controllers to receive the load addresses to said internal memory device, wherein said address encoder performs a 16 to 4 address encode to generate a read way signal to said internal memory device to read tile addresses.

19. The cache controller of claim 18 wherein said fetch logic circuit includes a plurality of mask registers for generating mask values representing the V portion of a UV tile to calculate the V start address value of a tile which contains a requested texel from said internal memory device.

20. The cache controller of claim 19 wherein said fetch logic circuit includes fetch logic state machine logic coupled to said UV address generator mask for initiating request signals to memory source external to said graphics processor to fetch new UV tile address values if a fetch request to said internal memory device misses.

21. The cache controller of claim 18 wherein said fetch logic circuit further includes a least recently used (LRU) logic circuit coupled to said tag registers for receiving incoming tile address and determining which of the tiles in said internal memory device should be modified.

* * * * *